(12) United States Patent
Li

(10) Patent No.: US 10,378,984 B2
(45) Date of Patent: Aug. 13, 2019

(54) PROCESS PRESSURE TRANSMITTER WITH POLYMER SEAL

(71) Applicant: Rosemount Inc., Shakopee, MN (US)

(72) Inventor: Baogang Li, Beijing (CN)

(73) Assignee: ROSEMOUNT INC., Shakopee, MN (US)

(*) Notice: Subject to any disclaimer, the term of this patent is extended or adjusted under 35 U.S.C. 154(b) by 139 days.

(21) Appl. No.: 15/500,578

(22) PCT Filed: Sep. 30, 2016

(86) PCT No.: PCT/CN2016/100974
§ 371 (c)(1),
(2) Date: Jan. 31, 2017

(87) PCT Pub. No.: WO2018/058487
PCT Pub. Date: Apr. 5, 2018

(65) Prior Publication Data
US 2018/0245998 A1    Aug. 30, 2018

(51) Int. Cl.
*G01L 9/00* (2006.01)
*G01L 19/00* (2006.01)
(Continued)

(52) U.S. Cl.
CPC .............. *G01L 9/0041* (2013.01); *G01L 9/00* (2013.01); *G01L 19/0007* (2013.01);
(Continued)

(58) Field of Classification Search
CPC .. G01L 9/0041; G01L 19/0007; G01L 19/147
(Continued)

(56) References Cited

U.S. PATENT DOCUMENTS 2,679,760 A * 6/1954 Harland et al. ..... G01L 19/0007
                                                  73/706
4,735,090 A   4/1988 Jeffrey et al.
(Continued)

FOREIGN PATENT DOCUMENTS

CN    1439094 A    8/2003
CN    101495846 A  7/2009
(Continued)

OTHER PUBLICATIONS

English Translation of WO2015188798A1, Date: Dec. 17, 2015, Publisher: European Patent Office, pp. 15.*
(Continued)

*Primary Examiner* — Andre J Allen
(74) *Attorney, Agent, or Firm* — Westman, Champlin & Koehler, P.A.

(57) ABSTRACT

A process pressure transmitter system includes a process pressure transmitter housing and a process pressure sensor in the process pressure transmitter housing. A metal flange is configured to mount to a process vessel which carries a process fluid. An isolation diaphragm attaches to the metal flange and is exposed to the process fluid through an opening in the process vessel. The isolation diaphragm comprises a polymer diaphragm bonded to a metal face of the metal flange. A capillary passageway carries a fill fluid from the isolation diaphragm to thereby convey a process pressure to the pressure sensor.

25 Claims, 6 Drawing Sheets

(51) Int. Cl.
  *G01L 19/14* (2006.01)
  *G01L 19/06* (2006.01)
(52) U.S. Cl.
  CPC .......... *G01L 19/0645* (2013.01); *G01L 19/14* (2013.01); *G01L 19/147* (2013.01)
(58) Field of Classification Search
  USPC .......................................... 73/723, 756, 820
  See application file for complete search history.

(56) References Cited

U.S. PATENT DOCUMENTS

| | | | | |
|---|---|---|---|---|
| 4,885,983 | A * | 12/1989 | Zavoda | F01B 19/00 |
| | | | | 92/104 |
| 4,950,499 | A * | 8/1990 | Martin et al. | C23C 14/205 |
| | | | | 204/192.14 |
| 6,038,961 | A * | 3/2000 | Filippi et al. | G01L 19/0645 |
| | | | | 29/454 |
| 6,223,603 | B1 * | 5/2001 | McKinnon | G01L 9/0075 |
| | | | | 73/718 |
| 6,781,814 | B1 * | 8/2004 | Greene | G01L 9/0075 |
| | | | | 361/283.1 |
| 6,782,754 | B1 | 8/2004 | Broden et al. | |
| 7,412,893 | B2 | 8/2008 | Hedtke | |
| 2007/0241916 | A1 | 10/2007 | Hedtke | |
| 2015/0377730 | A1 | 12/2015 | Xiaoang et al. | |

FOREIGN PATENT DOCUMENTS

| | | |
|---|---|---|
| CN | 105203252 A | 12/2015 |
| EP | 0 940 664 A1 | 9/1999 |
| WO | WO 2015188798 A1 * | 12/2015 ........... B23K 26/355 |

OTHER PUBLICATIONS

Notification of Transmittal of the International Search Report and the Written Opinion of the International Searching Authority from PCT/CN2016/100974, dated Jun. 27, 2017, 13 pages.
Communication from European Patent Application No. 16917239.2 dated Apr. 5, 2019.

* cited by examiner

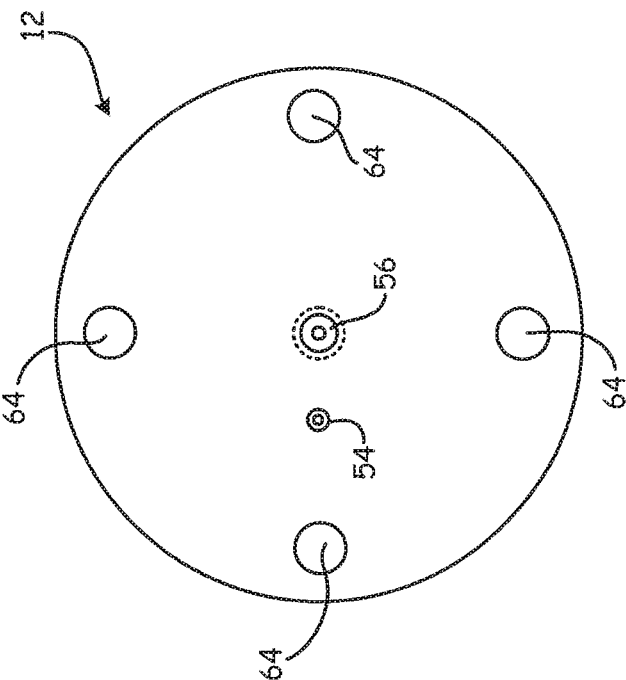
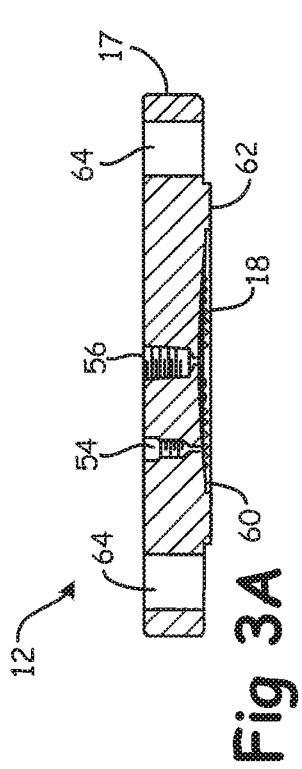
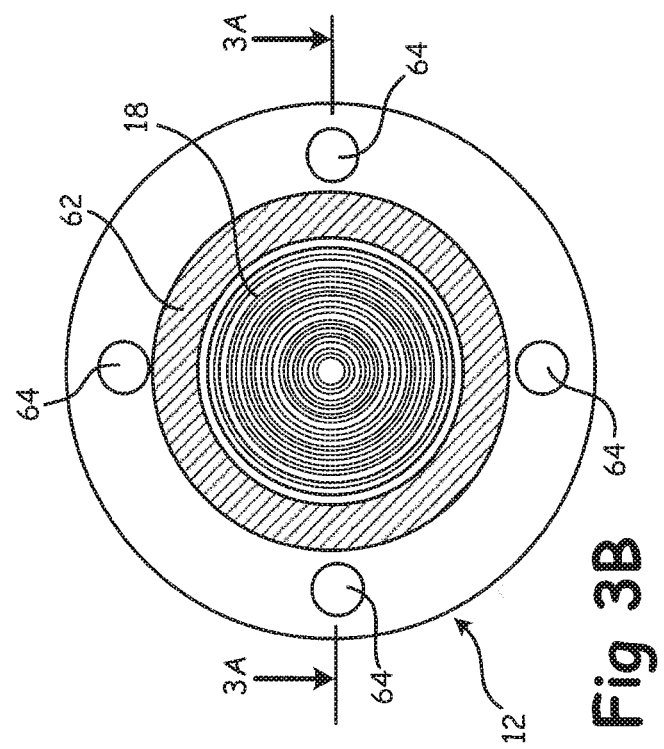

PROCESS PRESSURE TRANSMITTER WITH POLYMER SEAL

CROSS-REFERENCE TO RELATED APPLICATION

This Application is a Section 371 National Stage Application of International Application No. PCT/CN2016/100974, filed Sep. 30, 2016, not yet published, the contents of which are hereby incorporated by reference in their entirety.

BACKGROUND

The present invention relates to the process control industry. More specifically, the present invention relates to an isolation diaphragm or seal of the type used to couple a process control instrument to an industrial process.

Some types of process control instruments, such as pressure transmitters, have a pressure sensor which is fluidically coupled to an isolation diaphragm by a fill fluid. The isolation diaphragm comprises part of a subassembly called a "remote seal" or a "diaphragm seal" and isolates the pressure sensor from corrosive process fluids being sensed. Pressure is transferred from the isolation diaphragm to the sensor through the fill fluid which is substantially incompressible and fills cavities on both sides and a capillary tube (or thru-hole if the seal is directly mounted to the instrument). For a remote seal, the tube is typically flexible and may extend for several meters. The process medium contacts the remote isolation diaphragm which conveys the exerted pressure to the pressure sensor disposed in the transmitter housing.

Typically, the isolation diaphragm and any process wetted parts of the remote seal are made of a corrosion resistant material such that the process medium does not damage the diaphragm. It is also known in the art to provide a coating on the isolation diaphragm in order to protect the isolation diaphragm from corrosion due to contact with the process fluid. However, there is an ongoing need for improved isolation diaphragm protection.

SUMMARY

A process pressure transmitter system includes a process pressure transmitter housing and a process pressure sensor in the process pressure transmitter housing. A metal flange is configured to mount to a process vessel which carries a process fluid. An isolation diaphragm attaches to the metal flange and is exposed to the process fluid through an opening in the process vessel. The isolation diaphragm comprises a polymer diaphragm bonded to a metal face of the metal flange. A capillary passageway carries a fill fluid from the isolation diaphragm to thereby convey a process pressure to the pressure sensor.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

FIG. 3A is a side cross-sectional view taken along a line labeled 2A-2A in FIG. 3B, of a prior art remote seal.

FIG. 3B is a bottom plan view of the prior art remote seal in FIG. 3A.

FIG. 3C is a top plan view of the prior art remote seal of FIG. 3A.

DETAILED DESCRIPTION OF ILLUSTRATIVE EMBODIMENTS

The present invention includes a polymer diaphragm for use in coupling a pressure transmitter to a process fluid. In a specific configuration, a polymer diaphragm is bonded to a metal flange coupled to a process vessel such as a tank, process piping or other process component which contains a process fluid.

Figure 1:
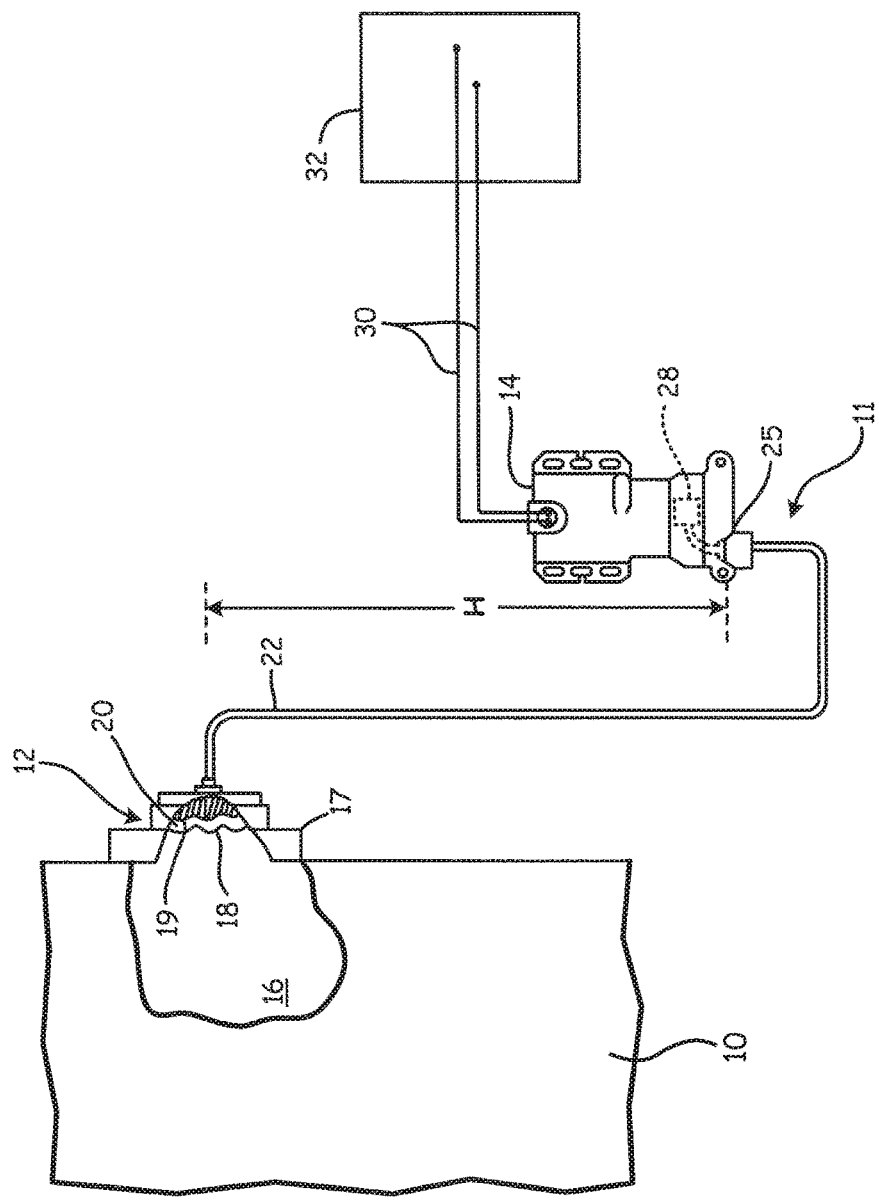
FIG. 1 is a simplified diagram showing a transmitter having a remote seal in accordance with the present invention.

FIG. 1 shows a remote seal 12 of a process variable transmitter 11. Remote seal 12 is connected to a transmitter diaphragm in housing 14. Remote seal 12 includes a housing (metal flange) 17 and is configured to couple to process fluid 16 through an opening in a process vessel 10.

Pursuant to one embodiment, transmitter 11 measures the pressure of process medium 16. Remote seal 12 includes a thin flexible diaphragm 18 which contacts process medium 16. Seal 12 also includes backplate 19 which, together with diaphragm 18, define cavity 20. Capillary tube 22 couples cavity 20 to pressure sensor 28 disposed in transmitter housing 14, such coupling being made via transmitter housing diaphragm 25 and a sealed fluid system connecting diaphragm 25 with sensor 28. The sealed fluid system, as well as cavity 20 and capillary tube 22, is filled with a suitable fluid for transmitting the process pressure to sensor 28. The fluid may include silicone, oil, glycerin and water, propylene glycol and water, or any other suitable fluid which preferably is substantially incompressible.

When process pressure is applied from process medium 16, diaphragm 18 displaces fluid, thereby transmitting the measured pressure from remote seal 12 through a passage in plate 19 and through tube 22 to pressure sensor 28. The resulting pressure is applied to pressure sensor 28, which can be based on any pressure sensing technology including a capacitance-based pressure cell. For a capacitance based sensor, the applied pressure causes such capacitance to change as a function of the pressure at medium 16. Sensor 28 can also operate on other known sensing principles, such as strain gauge technology, etc. In this embodiment, circuitry within transmitter housing 14 electronically converts the capacitance into a linear 4-20 mA transmitter output signal over wire pair 30 related to the process pressure. Any appropriate communication protocol may be used including the HART® communication protocol in which digital information is modulated on to a 4-20 mA current, the Foundation Fieldbus or Profibus communication protocols, etc. Process control loop 30 may also be implemented using wireless communication techniques. One example of wireless communication technique is the WirelessHART® communication protocol in accordance with IEC 62591.

Figure 2:
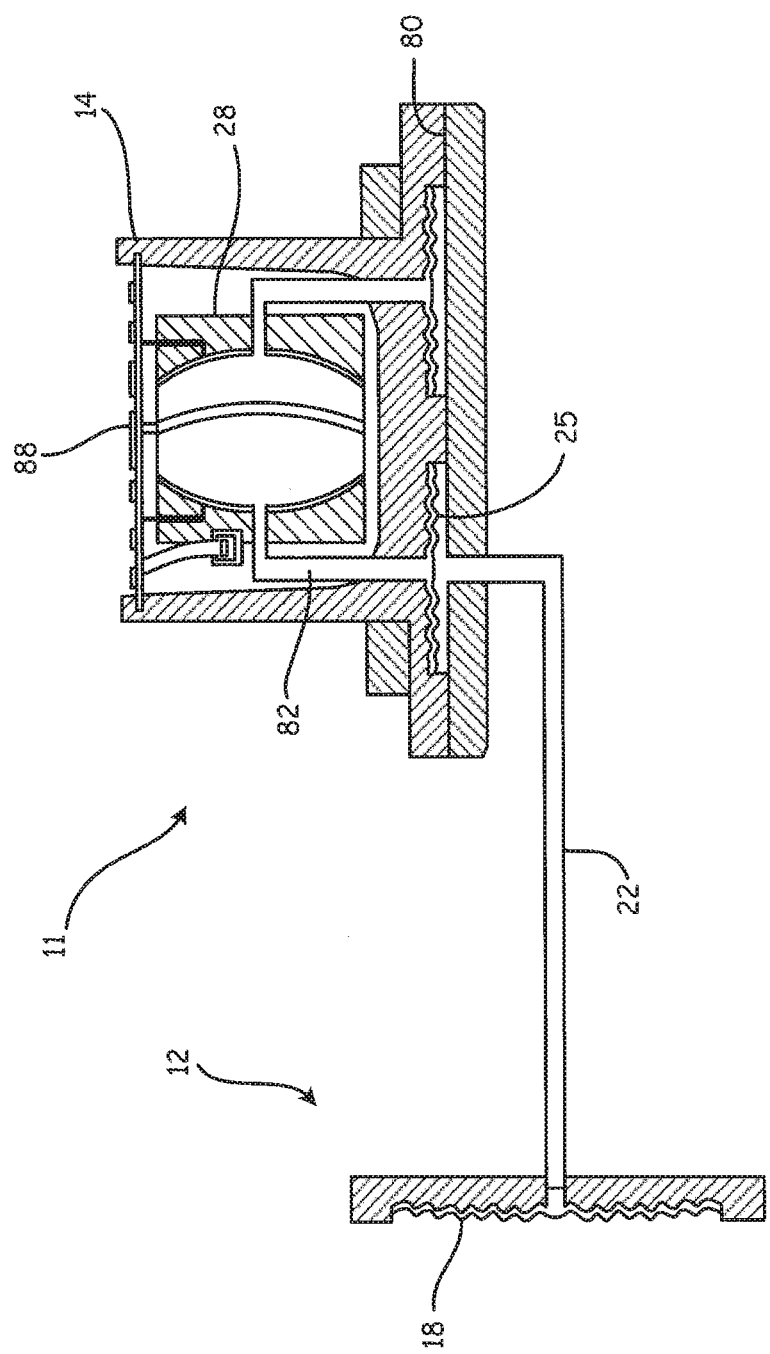
FIG. 2 is a simplified diagram showing a pressure transmitter system including a pressure transmitter coupled to a remote seal.

FIG. 2 is a simplified block diagram showing pressure transmitter system 11 in which process pressure sensor 28 is positioned in process pressure transmitter housing 14. As illustrated in FIG. 2, isolation diaphragm 25 is carried on a flange face 80 of housing 14. A first capillary passageway 82 carries an isolation fill fluid and extends from diaphragm 25 to the pressure sensor 28. Process diaphragm seal 18 couples to a process fluid and a second capillary passageway 22 carries a second fill fluid and extends from the process seal diaphragm 18 to the isolation diaphragm 25. As a pressure is applied to diaphragm 18, the diaphragm 18 flexes. This causes the pressure to be transferred through the second fill fluid to isolation diaphragm 25. In turn, isolation diaphragm 25 flexes and causes the pressure to be transferred to the fill fluid in capillary passageway 82. This can be sensed by pressure sensor 28 in accordance with known techniques. Transmitter electronics 88 are used to sense the applied pressure and communicate the information related to the applied pressure to another location.

FIG. 3A is a side cross-sectional view, FIG. 3B is a bottom plan view and FIG. 3C is a top plan view of a remote seal 12. Remote seal 12 is referred to as a, "flanged-flush design" and includes seal housing (metal flange) 17. Remote seal 12 also includes a hydraulic fluid (fill fluid) fill port 54, an instrument connection 56, and a flexible diaphragm 18 which is bonded by a bond 60 discussed below in more detail. Surface 62 is provided which is an annular shape and extends around diaphragm 18. Bolt holes 64 are used for coupling housing 17 to, for example, a tank filled with process fluid or some other process vessel.

Typically, housing 17 is formed from stainless steel and has a thickness of about 1 inch. Housing 17 is machined in a manner to be bonded to the circular polymer diaphragm 18. Gasket surface 62 is also machined on housing 17.

As discussed in the Background section, certain process fluids can damage isolation diaphragms such as diaphragm 18. For example, hydrofluoric acid (HF) and sodium hydroxide (NaOH) can cause corrosion of metal diaphragms which are typically used in remote seal applications. Such diaphragms are typically manufactured from a metallic sheet that is joined to a metallic body (or flange) by TIG welding, RSEW (Resistance Seam Welding) or braising. There are many different types of metals available which may be selected based upon a particular process medium. However, many metals which are highly corrosion resistant also exhibit reduced performance and still corrode over time. For example, alloy 400 (an alloy of about 67% Ni and 23% Cu) is a more economical metal that resists hydrofluoric acid. However, even alloy 400 will corrode after extended corrosion, particularly at higher temperatures. Other more expensive alternatives include gold and platinum.

One prior art technique to address such corrosion is to use a polymer diaphragm assembly. The polymer diaphragm is sandwiched between two metal flanges and sealed by two O-rings. Bolts are then used to mount the flanges together and energize the O-ring seal. The area behind the diaphragm is then filled with oil. However, the system cannot be disassembled and the mechanical fastening and sealing structure is less reliable than the welding techniques used with metal diaphragms.

Another prior art technique is to employ a diaphragm cover made of a corrosion resistant material which is placed over the metal diaphragm. The cover can be fabricated from a fluoropolymer such as PFA (perfluoroalkoxy alkanes) or FEP (fluorinaped ethylene propylene). The cover can be adhesively bonded to the metal diaphragm using, for example, grease. The cover acts to protect the metal diaphragm from being corroded by the process fluid. However, the cover decreases the sensitivity of the diaphragm to pressure applied by the process fluid which may lead to inaccurate measurements. Further, the configuration is not suitable for vacuum measurement.

In one example configuration, the present invention addresses the shortcomings of the prior art discussed above by employing a polymer diaphragm which is directly bonded to the metal flange of a seal. The polymer diaphragm can be joined to the metal housing using any appropriate technique.

Figure 4A:
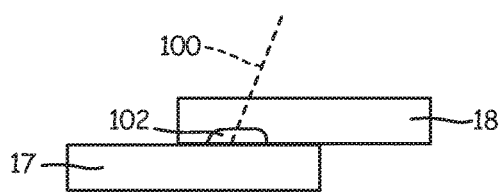
FIGS. 4A and 4B are side cross-sectional views showing a polymer diaphragm bonded to a metal flange.
Figure 4B:
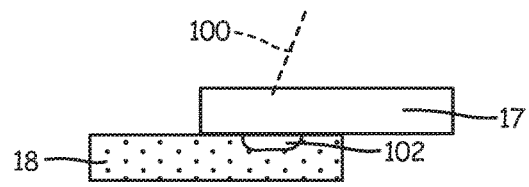

FIGS. 4A and 4B are cross-sectional views illustrating one example technique for bonding polymer diaphragm 18 to metal flange 17. Conventional welding techniques cannot be used for joining a polymer to a metal because the polymer has a much lower melting point than common metals. The welding temperature causes pyrolysis of the polymer material. However, a laser joining method may be implemented. FIG. 4A illustrates a laser transmission method in which a laser beam 100 is directed through the polymer diaphragm 18 and towards the metal flange 17. In such a configuration, the polymer diaphragm must be sufficiently optically transparent for the wave length of the applied laser beam 100 such that the metal flange 17 absorbs the substantial energy from the laser beam 100. The laser beam 100 thereby passes through the polymer diaphragm and heats the metal flange 17. The polymer diaphragm 18 is thus heated and melted in the region where the laser beam 100 is directed causing a weld or bond 102 to be formed. FIG. 4B illustrates a related configuration in which the laser beam 100 is applied to the metal flange 17. This provides heat conduction joining in which the laser beam 100 heats the backside of the metal flange 17. The polymer diaphragm 18 is heated and melted by means of heat conduction causing bond 102 to form. This joining method is appropriate for polymer diaphragms 18 which are not transparent to the laser beam 100. Additionally, the flange 17 should be sufficiently thin to allow more accurate heating (or "focusing" of the heating) of the interface between the flange 17 and the diaphragm 18.

In order to facilitate bonding of the polymer diaphragm 18 to the metal flange 17, the surface of the metal flange 17 can be subjected to surface structuring. Research has shown that appropriate micro structuring of a metal surface can lead to improved shear strength when joining the metal surface to a polymer material. Further, polymer to metal overlap joining is typically not possible without any surface treatment. A laser can be used to create microstructures on the metal surface.

Figure 5:
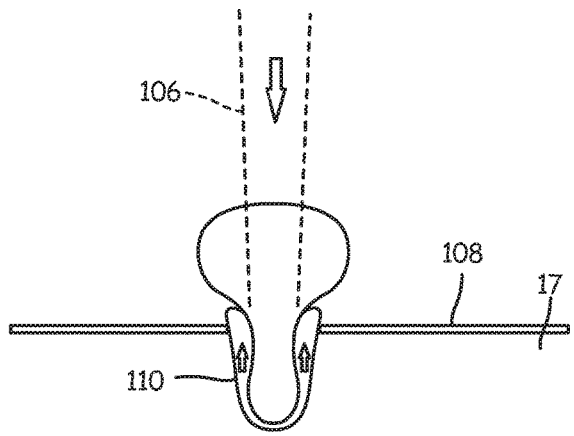
FIG. 5 is a side cross-sectional view showing structuring of a metal flange using a laser beam.

FIG. 5 is a side cross-sectional view of metal flange 17 being prestructured with a laser beam 106 applied to its surface 108. The applied laser beam 106 causes sublimation and melting of the surface 108 resulting in material removal thereby causing a hole 110 to be formed in the surface 108. The process is repeated across the bonding area on the surface 108. Such prestructuring allows a bond to be formed with a bond strength in the range of the strength of the polymer material used to form the diaphragm 18. With such structuring on the surface 108 of metal flange 17, the polymer diaphragm 18 can be joined by means of laser joining such as that discussed above. Other joining techniques may also be employed such as ultrasonic based joining and induction based joining techniques. Such prestructuring can be performed using, for example, the Tru-Micro7050 or 7240 available from Trumph Inc. of Farmington, Conn.

Figure 6A:
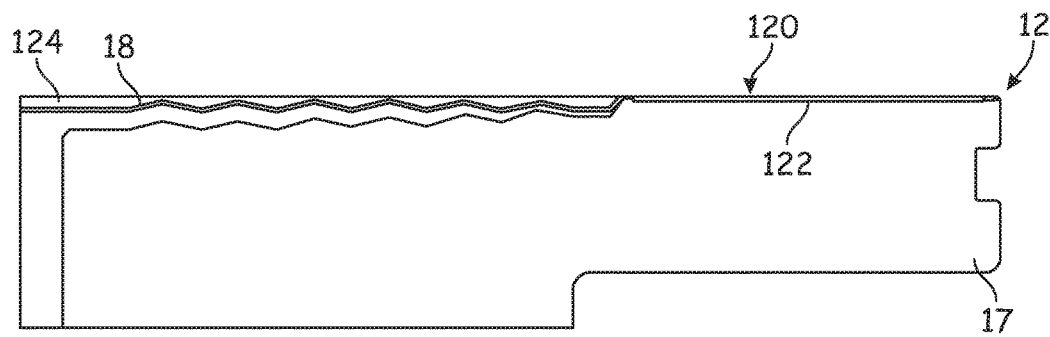
FIG. 6A is a side cross-sectional view of the polymer diaphragm joined to the metal flange.

FIG. 6A is a side cross-sectional view of remote seal 12 showing the bond between polymer diaphragm 18 and metal flange 17. As illustrated in FIG. 6A, the polymer diaphragm 18 extends over the metal flange 17 and forms a gasket surface area 120. A laser structured and joining zone 122 is formed on a surface of metal flange 17. It is this region on which the polymer diaphragm 18 is bonded to the metal flange 17.

The polymer diaphragm 18 can be formed using any forming technique including vacuum forming and injection molding. This is in contrast to a metallic diaphragm which may require complex forming dyes and applications of mechanical forming pressure. This can cause stress concentrations and may fracture in the metal diaphragm. Additionally, in one configuration, the polymer diaphragm 18 has a thickness which varies across its diameter. For example, the diaphragm 18 may be configured to be thinner in a central region 124 to thereby increase the sensitivity to applied pressure and thicker in the gasket surface area 120 to provide additional strength. Such a configuration is difficult to fabricate using techniques required to form a metal diaphragm.

Figure 6B:
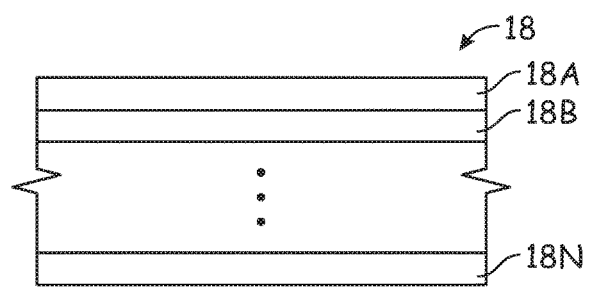
FIG. 6B is a enlarged view of a portion of the polymer diaphragm shown in FIG. 6A.

In one configuration shown in FIG. 6B, the diaphragm 18 is formed of multiple layers 18A, 18B . . . 18N. Such layers can be barrier layers used to reduce corrosion and prevent process fluid from seeping through the diaphragm or provide other desired properties. Example barrier polymers include EVOH (Ethylene Vinyl Alcohol), LCP (Liquid Crystal Polymers), PET (Polyethylene Terephthalate), PEN (Polyethylene Naphthalate), PVDC (Polyvinylidene Chloride), etc. These materials can be laminated to a base polymer/plastic material such that the diaphragm 18 has a multilayer composition.

In another example configuration, diaphragm 18 comprises an underlying metal layer 18N bonded to a polymer layer. For example, the underlying metal layer 18N can comprise gold or other metal and can be used to reduce hydrogen permeation through the diaphragm. Any appropriate bonding technique may be used in such a configuration including for example, the metal layer can be sputtered on to the polymer layer.

Figure 7:
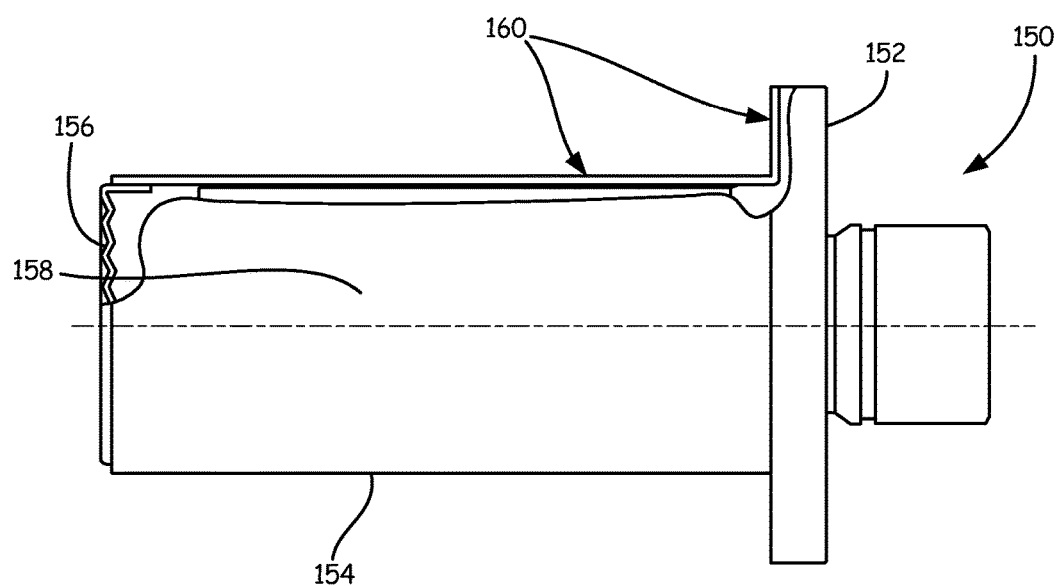
FIG. 7 is a side cross-sectional view of an extended flange seal (EFW) including a polymer shield.

The invention is also applicable to other seal configurations. For example, FIG. 7 shows an extended flange seal (EFS) 150 having a flange 152 which carries an extended portion 154. A diaphragm 156 is positioned at a distal end of the extending portion and communicates an applied pressure through a fill fluid carried in capillary 158. This can be applied to the pressure sensor as discussed above. In such a configuration, a polymer shield 160 can be bonded to the metal which forms extended flange seal 150. This bonding can occur anywhere along the extended portion 154 and the interior face of flange 152. In one configuration, a polymer diaphragm 156 is employed as discussed above. In another example configuration a metal diaphragm 156 is employed having a polymer coating bonded thereon.

Although the present invention has been described with reference to preferred embodiments, workers skilled in the art will recognize that changes may be made in form and detail without departing from the spirit and scope of the invention. The remote seal may be of a configuration other than those specifically illustrated herein. Examples include flanged seal types such as a flushed flange seal, an extended flanged seal or a pancake seal. Other configurations include threaded seals (RTW), union connection seals, chemical tee seals, threaded pipe mount seals, saddle and flow-through seals, etc. The capillary passageway 22 may be elongate such as that illustrated in FIG. 1, or, in another example configuration, may be relatively short whereby the transmitter mounts directly to the seal. The polymer diaphragm improves the corrosion resistance of the seal. In one configuration, the remote seal with the polymer diaphragm welded thereon can be installed as a single component such that internal mechanical fastening and sealing structures are not required. Such configurations also improve sensitivity to an applied pressure signal and can be employed for vacuum measurement. In one configuration, the metal flange is formed of stainless steel. Polymer diaphragm 18 may include a coating on one or both of its sides. The coating may be on either side depending upon the desired characteristics such as providing a barrier or additional protection from process fluid. The coating may be metallic or nonmetallic. In one configuration, a diamond-like carbon (DLC) coating is provided on the polymer diaphragm. The diaphragm configuration discussed herein may be employed in a remote seal configuration or can be used to provide an isolation diaphragm on a pressure transmitter.

What is claimed is:

1. A process pressure transmitter system, comprising:
   a process pressure transmitter housing;
   a process pressure sensor in the process pressure transmitter housing;
   a metal flange configured to mount to a process vessel which carries a process fluid; and
   an isolation diaphragm attached to the metal flange and exposed to the process fluid through an opening in the process vessel, the isolation diaphragm comprising a polymer diaphragm gasket surface area bonded to a structured joining zone on a metal face of the metal flange;
   a capillary passageway which carries a fill fluid from the isolation diaphragm to thereby convey a process pressure to the pressure sensor.

2. The process pressure transmitter system of claim 1 wherein the metal flange comprises a remote seal.

3. The process pressure transmitter system of claim 1 wherein the polymer diaphragm is welded to the face of the metal flange.

4. The process pressure transmitter system of claim 1 wherein the polymer diaphragm is bonded to the metal face using a laser bond.

5. The process pressure transmitter system of claim 4 wherein the laser bond comprises a laser transmission bond.

6. The process pressure transmitter system of claim 4 wherein the laser bond comprises a laser heat conduction bond.

7. The process pressure transmitter system of claim 1 wherein the polymer diaphragm is bonded to the metal face of the metal flange by an ultrasonic bond.

8. The process pressure transmitter system of claim 1 wherein the polymer diaphragm is bonded to the metal face of the metal flange by an induction bond.

9. The process pressure transmitter system of claim 1 wherein the structured region is configured to promote bonding between the polymer diaphragm and the metal face.

10. The process pressure transmitter system of claim 9 wherein the structured joining region is fabricated by a microstructure treatment.

11. The process pressure transmitter system of claim 10 wherein the microstructure treatment comprises a laser treatment.

12. The process pressure transmitter system of claim 9 wherein the structured region comprises a laser structured region.

13. The process pressure transmitter system of claim 1 wherein the laser structure comprises microstructures.

14. The process pressure transmitter system of claim 1 wherein the polymer diaphragm has a thickness which varies.

15. The process pressure transmitter system of claim 1 wherein a thickness of the polymer diaphragm is thinner near a central region of the polymer diaphragm and thicker proximate an edge region of the polymer diaphragm.

16. The process pressure transmitter system of claim 14 wherein the polymer diaphragm comprises a laminated polymer diaphragm.

17. The process pressure transmitter system of claim 15 wherein the polymer diaphragm comprises a multilayer composite diaphragm.

18. The process pressure transmitter system of claim 1 wherein the polymer diaphragm is coated with a metal film.

19. The process pressure transmitter system of claim 1 wherein the metal film is coated onto on at least one side of the polymer diaphragm.

20. The process pressure transmitter system of claim 17, wherein the metal film comprises a sputtered layer.

21. The process pressure transmitter system of claim 17 wherein the metal film comprises gold.

22. The process pressure transmitter system of claim 1 wherein the polymer diaphragm includes a barrier layer.

23. The process pressure transmitter system of claim 1 wherein the fill fluid conveys the process pressure to a second diaphragm coupled to the pressure sensor through a second fill fluid.

24. A method of coupling a process pressure transmitter to a pressure of an industrial process fluid, comprising:
   obtaining a metal flange configured to couple to a process vessel, the metal flange including a structured joining region;
   obtaining a polymer diaphragm having a gasket surface area;
   attaching the gasket surface area of the polymer diaphragm to the structured joining region of the metal flange;
   applying a pressure of a process fluid carried in the process vessel to the polymer diaphragm;
   coupling the pressure applied to the polymer diaphragm to a pressure sensor using a capillary passageway; and
   measuring the process pressure using the pressure sensor.

25. The process pressure transmitter system of claim 9 wherein the structured joining region comprises a laser structured region.

* * * * *